US011425329B2

(12) United States Patent
Hayashi et al.

(10) Patent No.: US 11,425,329 B2
(45) Date of Patent: *Aug. 23, 2022

(54) RECORDING/REPRODUCING DEVICE, RECORDING/REPRODUCING METHOD, AND PROGRAM FOR MOVABLE OBJECT AND RECORDING AND REPRODUCING CAPTURED BY CAMERA

(71) Applicant: JVCKENWOOD Corporation, Yokohama (JP)

(72) Inventors: Keita Hayashi, Yokohama (JP); Toshitaka Murata, Yokohama (JP); Takuji Teruuchi, Yokohama (JP)

(73) Assignee: JVCKENWOOD CORPORATION, Yokohama (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/321,224

(22) Filed: May 14, 2021

(65) Prior Publication Data

US 2021/0274124 A1 Sep. 2, 2021

Related U.S. Application Data

(63) Continuation of application No. PCT/JP2019/048844, filed on Dec. 13, 2019.

(30) Foreign Application Priority Data

Feb. 27, 2019 (JP) .............................. JP2019-033740

(51) Int. Cl.
*H04N 5/775* (2006.01)
*G06T 7/70* (2017.01)
(Continued)

(52) U.S. Cl.
CPC ............... *H04N 5/775* (2013.01); *B60R 1/00* (2013.01); *G06F 3/013* (2013.01); *G06F 3/147* (2013.01);
(Continued)

(58) Field of Classification Search
None
See application file for complete search history.

(56) References Cited

U.S. PATENT DOCUMENTS 9,547,365 B2 * 1/2017 Raffle .................... G06F 3/013
10,116,873 B1 * 10/2018 Campbell ............ H04N 5/2628
(Continued)

FOREIGN PATENT DOCUMENTS

CN 103295370 A 9/2013
EP 2808826 A2 * 12/2014 ............... B60R 1/00
(Continued)

*Primary Examiner* — Stefan Gadomski
(74) *Attorney, Agent, or Firm* — Procopio, Cory, Hargreaves & Savitch LLP

(57) ABSTRACT

A recording/reproducing device includes a captured data acquisition unit that acquires captured data, an event detection unit that detects occurrence of an event on a movable object, a recording control unit, a display unit that displays a video contained in event recording data, a line-of-sight detection unit, and a reproduction control unit. The recording control unit stores, as event recording data, the captured data for a predetermined period from at least part of the captured data on the basis of detection of an event. The line-of-sight detection unit detects that a user's line of sight is pointing towards the display unit. The reproduction control unit starts reproduction of the event recording data when it is detected that the user's line of sight is pointing towards the display unit within a predetermined period after detection of the event.

5 Claims, 12 Drawing Sheets

(51) Int. Cl.
  *B60R 1/00*      (2022.01)
  *G06F 3/01*      (2006.01)
  *G07C 5/08*      (2006.01)
  *H04N 5/247*     (2006.01)
  *H04N 7/18*      (2006.01)
  *G06F 3/147*     (2006.01)
  *G06V 20/59*     (2022.01)

(52) U.S. Cl.
  CPC .............. *G06T 7/70* (2017.01); *G06V 20/597* (2022.01); *G07C 5/0841* (2013.01); *H04N 5/247* (2013.01); *H04N 7/18* (2013.01); *H04N 7/188* (2013.01); *B60R 2300/802* (2013.01); *G06T 2207/30201* (2013.01); *G06T 2207/30268* (2013.01)

(56) References Cited

U.S. PATENT DOCUMENTS

| | | | | |
|---|---|---|---|---|
| 11,216,064 | B2* | 1/2022 | Fujita | G06F 3/013 |
| 2008/0133088 | A1 | 6/2008 | Yamada | |
| 2010/0171829 | A1* | 7/2010 | Yago | G07C 5/0858 348/143 |
| 2015/0232030 | A1* | 8/2015 | Bongwald | B60R 1/00 348/115 |
| 2016/0109946 | A1* | 4/2016 | George-Svahn | G06F 3/04842 345/156 |
| 2017/0060234 | A1* | 3/2017 | Sung | G06F 3/147 |
| 2017/0247041 | A1* | 8/2017 | Kim | A61B 5/18 |
| 2018/0032300 | A1* | 2/2018 | Singh | B60K 35/00 |
| 2018/0133593 | A1* | 5/2018 | Wilson | G06T 15/06 |
| 2018/0201207 | A1* | 7/2018 | Kim | B60R 1/006 |
| 2018/0321740 | A1* | 11/2018 | Bryson | G06F 3/013 |
| 2018/0359429 | A1* | 12/2018 | Shinkai | G08G 1/166 |
| 2019/0004514 | A1* | 1/2019 | Hiwatashi | B60W 30/00 |
| 2019/0043327 | A1* | 2/2019 | Stent | G06V 10/255 |
| 2019/0135176 | A1* | 5/2019 | Miki | G07C 5/0816 |
| 2019/0197327 | A1* | 6/2019 | Mangla | G06T 11/00 |
| 2019/0246036 | A1* | 8/2019 | Wu | G06F 21/31 |
| 2019/0315275 | A1* | 10/2019 | Kim | B60R 1/00 |
| 2020/0249820 | A1* | 8/2020 | Choi | G06F 3/013 |
| 2020/0259997 | A1 | 8/2020 | Hayashi et al. | |
| 2020/0379558 | A1* | 12/2020 | Sörner | G06F 3/013 |
| 2020/0384929 | A1* | 12/2020 | Kobayashi | B60R 11/04 |
| 2021/0001723 | A1* | 1/2021 | Nishiyori | G06V 20/597 |
| 2021/0146934 | A1* | 5/2021 | Inagaki | B60K 28/066 |
| 2021/0197724 | A1* | 7/2021 | Gu | G06V 40/171 |
| 2021/0337111 | A1 | 10/2021 | Hayashi et al. | |

FOREIGN PATENT DOCUMENTS

| | | | | |
|---|---|---|---|---|
| EP | 3040809 | A1 * | 7/2016 | ............. B60K 35/00 |
| JP | 2007-036846 | A | 2/2007 | |
| JP | 2009-087007 | A | 4/2009 | |
| JP | 2012201232 | A * | 10/2012 | |
| JP | 2014-126997 | A | 7/2014 | |
| JP | 2019212110 | A | 12/2019 | |
| KR | 20100120767 | A * | 11/2010 | |
| WO | WO-2015088982 | A1 * | 6/2015 | ............. B60K 35/00 |

* cited by examiner

RECORDING/REPRODUCING DEVICE, RECORDING/REPRODUCING METHOD, AND PROGRAM FOR MOVABLE OBJECT AND RECORDING AND REPRODUCING CAPTURED BY CAMERA

CROSS REFERENCE TO RELATED APPLICATION

The present application is a Bypass Continuation of PCT/JP2019/048844 filed on Dec. 13, 2019, which is based upon and claims the benefit of priority from Japanese Patent Application No. 2019-033740, filed on Feb. 27, 2019, the disclosure of which are incorporated herein in its entirety by reference.

BACKGROUND

The present invention relates to a recording/reproducing device, recording/reproducing method, and program.

A dashboard camera that includes a means of taking pictures of the situation around a vehicle and acquiring data such as a video and a means of detecting that the vehicle has received some impact, and stores, in a reproducible manner, a video or the like for a predetermined period of time on the basis of the point of time when an impact on the vehicle is detected is widely used. For example, Japanese Unexamined Patent Application Publication No. 2009-087007 discloses a dashboard camera that records video data on the basis of the transition of acceleration. When an event such as an accident is detected, this dashboard camera stores the situation of the accident in a reproducible manner. Further, when abnormal acceleration due to dangerous driving or the like is detected, the dashboard camera stores the situation of the dangerous driving in a reproducible manner.

SUMMARY

However, not a few users of a dashboard camera do not fully know how to operate the dashboard camera. Further, when an event such as an accident is detected, a user cannot instantly perform a complicated operation. Thus, a user cannot appropriately reproduce a video or the like of an event stored in the dashboard camera in some cases.

The present embodiments have been accomplished to solve the above problems and an object of the embodiments is thus to provide a recording/reproducing device and the like that reproduce stored data without a complicated operation.

A recording/reproducing device according to an embodiment is a recording/reproducing device placed in a movable object and recording and reproducing captured data captured by a camera, the device including a captured data acquisition unit configured to acquire the captured data, an event detection unit configured to detect occurrence of an event on the movable object, a recording control unit configured to store, as event recording data, the captured data for a predetermined period from at least part of the captured data on the basis of detection of the event, a line-of-sight detection unit configured to detect that a user's line of sight is pointing towards a display unit configured to display the event recording data, and a reproduction control unit configured to start reproduction of the event recording data when the line-of-sight detection unit detects that a line of sight is pointing towards the display unit within a predetermined period after detection of the event.

A recording/reproducing method according to an embodiment is a recording/reproducing method of recording and reproducing captured data captured by a camera placed in a movable object, and it includes a captured data acquisition step, an event detection step, a recording control step, a line-of-sight detection step, and a reproduction control step. The captured data acquisition step acquires captured data captured by a camera placed in a movable object. The event detection step detects occurrence of an event on the movable object. The recording control step stores, as event recording data, the captured data for a predetermined period from at least part of the captured data on the basis of detection of the event. The line-of-sight detection step detects that a user's line of sight is pointing towards a display unit for displaying the event recording data. The reproduction control step starts reproduction of the event recording data when the line-of-sight detection step detects that a line of sight is pointing towards the display unit within a predetermined period after detection of the event.

A program according to an embodiment is a program to be executed by a computer to put a recording/reproducing device into operation. The recording/reproducing method includes a captured data acquisition step, an event detection step, a recording control step, a line-of-sight detection step, and a reproduction control step. The captured data acquisition step acquires captured data captured by a camera placed in a movable object. The event detection step detects occurrence of an event on the movable object. The recording control step stores, as event recording data, the captured data for a predetermined period from at least part of the captured data on the basis of detection of the event. The line-of-sight detection step detects that a user's line of sight is pointing towards a display unit for displaying the event recording data. The reproduction control step starts reproduction of the event recording data when the line-of-sight detection step detects that a line of sight is pointing towards the display unit within a predetermined period after detection of the event.

This embodiment provides a recording/reproducing device and the like that reproduce stored data without a complicated operation.

DETAILED DESCRIPTION

The following description and the attached drawings are appropriately shortened and simplified to clarify the explanation. In the figures, the identical reference symbols denote identical structural elements and the redundant explanation thereof is omitted according to need.

First Embodiment

A configuration according to a first embodiment is described hereinafter with reference to the drawings. A recording/reproducing device 10 according to this embodiment is used by being placed in a vehicle such as an automobile, which is a movable object, and records and reproduces captured data that has been taken by a camera, and it is a device called a dashboard camera, for example. The recording/reproducing device 10 has a function of, when a sudden impact or the like is applied, recording captured data for a predetermined period in such a way that it is reproducible as "event recording data", triggered by the applied impact. A driver or the like of the automobile reproduces this event recording data and views a video of the reproduced event recording data, and thereby grasps the situation of the event.

Figure 1:
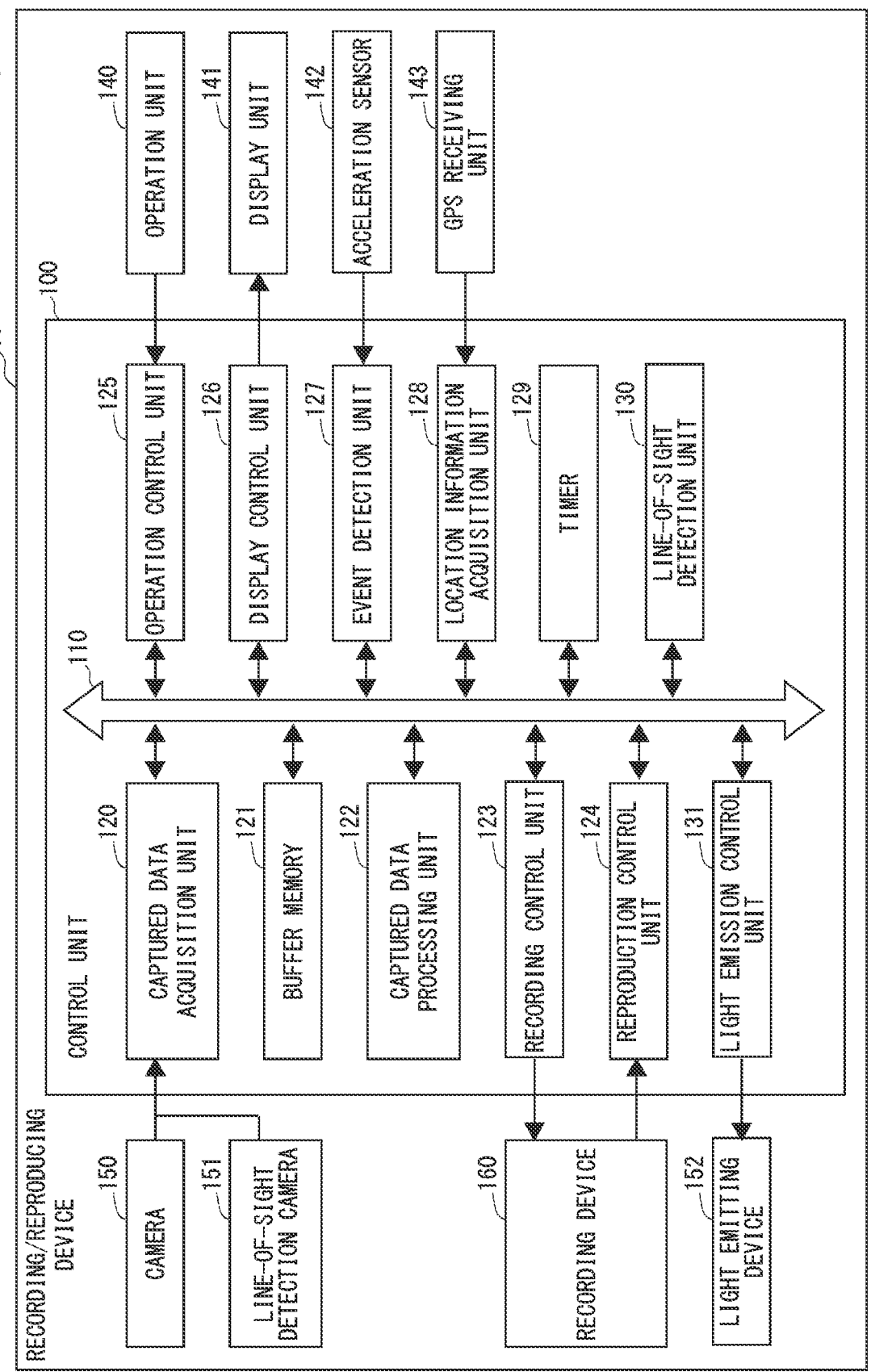
FIG. 1 is a block diagram showing the configuration of a recording/reproducing device according to a first embodiment.

FIG. 1 is a block diagram showing the configuration of a recording/reproducing device according to the first embodiment. As shown therein, the recording/reproducing device 10 includes a control unit 100 that controls each component and a plurality of components connected to the control unit 100. The control unit 100 is a control device that includes a circuit board on which a CPU (Central Processing Unit), a GPU (Graphics Processing Unit) memory, a plurality of interfaces and the like are mounted, and it executes a stored program and executes various processing.

The details of the control unit 100 are described hereinbelow. The control unit 100 includes a captured data acquisition unit 120, a buffer memory 121, a captured data processing unit 122, a recording control unit 123, a reproduction control unit 124, an operation control unit 125, a display control unit 126, an event detection unit 127, a location information acquisition unit 128, a timer 129, a line-of-sight detection unit 130, and a light emission control unit 131, and those elements of performing processing and control are implemented by a program executed by the control unit 100. For the sake of convenience, those elements are represented in such a way that each of them is connected to a bus line 110.

The captured data acquisition unit 120 acquires captured data that is supplied from a camera 150. The captured data acquisition unit 120 supplies the captured data to the buffer memory 121 through the bus line 110. Further, the captured data acquisition unit 120 acquires captured data that is supplied from a line-of-sight detection camera 151, and supplies the acquired captured data to the line-of-sight detection unit 130.

The buffer memory 121 is a volatile or non-volatile memory device. The buffer memory 121 sequentially receives captured data generated periodically by the camera 150 through the captured data acquisition unit 120, and temporarily stores the received captured data. The captured data temporarily stored in the buffer memory 121 is data for a predetermined period. The buffer memory 121 sequentially erases the captured data after the predetermined period of time has elapsed or sequentially overwrites them with newly received captured data.

The captured data processing unit 122 generates a captured file in a format conforming to predetermined specifications from the captured data stored in the buffer memory 121. The predetermined specifications are specifications such as H.264 or MPEG-4 (Moving Picture Experts Group), for example.

Note that the captured data processing unit 122 may generate a captured file with a predetermined angle of view by processing captured data. Further, the captured data processing unit 122 may generate a captured file by processing captured data output from the buffer memory 121, generating captured data for a predetermined length of time or with a predetermined angle of view, and adding header information or the like such as a file name. Further, the captured data processing unit 122 may process captured data output from the buffer memory 121 and perform noise removal, distortion correction and the like of the captured data, or may generate a captured file in which time information, vehicle speed information, vehicle location information and the like are displayed on the captured data.

The recording control unit 123 performs control to store the captured file generated by the captured data processing unit 122 into a recording device 160. When the event detection unit 127 detects an event, the recording control unit 123 stores, into the recording device 160, a captured file for a predetermined period as event recording data that is not overwritable on the basis of the detection of an event. The recording control unit 123 stores the event recording data into a predetermined recording area in the recording device 160. The predetermined recording area is a storage area that is protected from overwrite or erasure, for example. Alternatively, the event recording data that is supplied from the recording control unit 123 to the recording device 160 may be stored with a flag indicating protection from overwrite or erasure contained in a file.

Further, the recording control unit 123 records, into the recording device 160, information indicating whether the event recording data stored in the recording device 160 has been reproduced by the reproduction control unit 124 in the past. The reproduction control unit 124 thereby identifies which event recording data has not been reproduced.

Note that, when the event detection unit 127 does not detect any event, the recording control unit 123 may store the captured file in an overwritable state into the recording device 160. A captured file that is stored in the recording device 160 and different from the event recording data is referred to hereinafter as a "normal file". When the recording device 160 reaches its maximum capacity, the recording control unit 123 may erase the oldest normal file and record a newly generated normal file into the recording device 160.

The reproduction control unit 124 performs processing for reproducing the stored event recording data under a preset condition. The preset condition is the case where it is detected that a user's line of sight is pointing towards a display unit 41 within a predetermined period of time after an event is detected. In this case, the reproduction control unit 124 receives, from the line-of-sight detection unit 130, a signal indicating that a user's line of sight is pointing towards the display unit 141.

The reproduction control unit 124 monitors the timer 129 and determines whether a predetermined period of time has elapsed after detection of an event. When reproducing the event recording data, the reproduction control unit 124 reads the event recording data stored in the recording device 160, and supplies the read event recording data to the display control unit 126. Note that the above-described predetermined period of time is an appropriate period of time, such as 1, 3, or 5 minutes, for example, to make a request for reproducing the event recording data after the occurrence of an event such as an accident in order to check the event.

The reproduction control unit 124 starts reproducing the event recording data when it detects that a user's line of sight is pointing towards the display unit 141 within a predetermined period of time after an event is detected, which is the time when the event is detected. The reproduction control unit 124 may start reproducing the event recording data when it detects that a user's line of sight is pointing towards the display unit 141 within a predetermined period of time after an event is detected and storing of the event recording data is done. Further, when the reproduction control unit 124 detects that a user's line of sight is pointing towards the display unit 141 before storing of the event recording data is done, it may start reproducing the stored event recording data after storing of the event recording data is done, or may start reproducing the event recording data before storing of the event recording data is done if reproduction of the event recording data is possible.

The operation control unit 125 acquires operation information received by an operation unit 140, and outputs an operation instruction based on the operation information to each component. When the operation control unit 125 acquires an instruction of selecting data to be reproduced from the operation unit 140, it causes the reproduction control unit 124 to select a file or the like recorded in the recording device 160. When the operation control unit 125 acquires an instruction related to reproduction of data from the operation unit 140, it causes the reproduction control unit 124 to perform processing related to reproduction. The instruction related to reproduction of data is reproduction start, pause, reproduction stop, zoom display and the like, for example.

The display control unit 126 controls the display unit 141 to display various information. For example, the display control unit 126 causes the display unit 141 to display captured data which the camera 150 is taking. Further, the display control unit 126 receives the event recording data supplied from the reproduction control unit 124, and causes the display unit 141 to display the received event recording data. When the display unit 141 is provided with a touch sensor as a function of the operation unit 140, the display control unit 126 causes the display unit 141 to display an icon or the like corresponding to the touch sensor as appropriate.

The event detection unit 127 receives information related to acceleration detected by an acceleration sensor 142, and detects the occurrence of a specified event from a signal size or a signal pattern of the received information. Externally applied acceleration is acceleration that is applied to the recording/reproducing device 10 from the outside, and it is acceleration caused by an impact or the like that occurs when an automobile collides with another object, for example.

When the event detection unit 127 detects that the information received from the acceleration sensor 142 corresponds to the occurrence of a specified event, it supplies a signal indicating that the occurrence of an event is detected to the captured data processing unit 122. The occurrence of an event is the case where acceleration that occurs in the event of an accident such as an impact caused by sudden braking or an impact when an object hits a vehicle, for example, is detected. The event detection unit 127 detects the occurrence of an event when acceleration towards a predetermined direction exceeding a predetermined value is detected for a period exceeding a predetermined period of time or when there is a significant change in acceleration during a predetermined period of time, for example. Note that the event detection unit 127 may detect acceleration in x-axis, y-axis and z-axis, which are coordinate axes in a 3-axis coordinate system, or may detect acceleration in at least one direction among them. Further, weights may be assigned to acceleration received from the 3-axis directions. The event detection unit 127 supplies a signal indicating that occurrence of an event is detected also to the timer 129.

The location information acquisition unit 128 receives a signal from a GPS satellite received by a GPS (Global Positioning System) receiving unit 143, acquires location information, which is information about the current location from the received signal, and supplies the acquired location information to the recording control unit 123. The location information contains the latitude and longitude of a vehicle at the time when the signal is received from the GPS satellite, for example.

The timer 129 receives a signal indicating that the occurrence of an event is detected from the event detection unit 127, and on the basis of this signal as a trigger signal, resets a count value of the timer and activates itself. Once activated, the timer 129 counts up to the predetermined period.

The line-of-sight detection unit 130 receives the captured data acquired from the line-of-sight detection camera 151 by the captured data acquisition unit 120, and detects that a user's line of sight is pointing towards the display unit 141 from the received captured data. The line-of-sight detection unit 130 detects a line of sight by recognizing the positions of eyes included in the user's face from the received captured data and analyzing the motion of the pupils and the Purkinje images in the detected eyes. Note that line-of-sight detection technology is widely known to those skilled in the art, and the detailed description thereof is omitted.

The line-of-sight detection unit 130 receives captured data corresponding to the frame rate (e.g., 30 frames per second) of the line-of-sight detection camera 151 from the captured data acquisition unit 120. An example of the case of detecting that a user's line of sight is pointing towards the display unit 141 is when a user's line of sight is pointing towards the display unit 141 continuously for a predetermined period of time (e.g., 1 second). Another example of the case of detecting that a user's line of sight is pointing towards the display unit 141 is when a user's line of sight is pointing towards the display unit 141 at a frequency of 80 percents or more of a predetermined period of time (e.g., 1.5 seconds). In this manner, when the frequency that a user's line of sight is pointing towards the display unit 141 is high during a predetermined period of time, the line-of-sight detection unit 130 supplies a signal indicating that the user's line of sight is pointing towards the display unit 141 to the reproduction control unit 124.

The light emission control unit 131 is a driver that controls a light emitting device 152. The light emission control unit 131 supplies a signal for lighting the light emitting device 152 to the light emitting device 152 when performing line-of-sight detection.

Each of elements that are connected to the control unit 100 is described hereinafter. The recording/reproducing device 10 includes the operation unit 140, the display unit 141, the acceleration sensor 142, the GPS receiving unit 143, the camera 150, the line-of-sight detection camera 151, the light emitting device 152, and the recording device 160.

The operation unit 140 is a user interface for receiving a user's operation on the recording/reproducing device 10. The user interface may be an operation button or a touch sensor placed on the display unit 141, for example. Further, the user interface may be a receiving unit of infrared rays or radio communication, and it may receive a signal transmitted from a remote control or the like. The operation unit 140 supplies operation information, which is information about a received operation, to the control unit 100 through a specified interface. The operation information is an instruction for starting event recording or an instruction for reproducing event recording data, for example.

The display unit 141 is a display device that displays various information by control of the display control unit 126. The display unit 141 at least includes a display panel such as a liquid crystal panel or an organic EL (Electro Luminescence), for example. The display unit 141 connects to the display control unit 126 and displays a signal supplied from the display control unit 126. The display unit 141 is configured to display a video contained in the event recording data.

The acceleration sensor 142 is a 3-axis acceleration sensor, for example, and it is placed in an arbitrary position of the recording/reproducing device 10. The acceleration sensor 142 detects acceleration applied to the acceleration sensor 142, and supplies information about the detected acceleration to the control unit 100 according to the detected acceleration. The acceleration sensor 142 connects to the event detection unit 127 and supplies information about the detected acceleration to the event detection unit 127. Note that the state about acceleration that is supplied from the acceleration sensor 142 to the control unit 100 can be used also by another element and, to be more specific, the reproduction control unit 124 also uses the information about acceleration received from the acceleration sensor 142. Note that the acceleration sensor 142 may be a 1-axis or 2-axis acceleration sensor instead of a 3-axis acceleration sensor.

The GPS receiving unit 143 receives information about the current location of a vehicle by a satellite positioning system called GPS or GNSS (Global Navigation Satellite System). The GPS receiving unit 143 may be an antenna for receiving a GPS signal or a communication interface for receiving location information acquired by a vehicle. The GPS receiving unit 143 supplies a signal about the received current location to the location information acquisition unit 128.

The camera 150 is an imaging device that includes an objective lens, an imaging element, an A-D (Analog to Digital) conversion element and the like.

The camera 150 captures video images containing the view around a vehicle, which is a movable object, and generates captured data, which is data of the captured video images. The camera 150 supplies the generated captured data to the captured data acquisition unit 120.

The line-of-sight detection camera 151 is an imaging device for detecting a user's line of sight included in a captured user's face. The line-of-sight detection camera 151 captures video images of a user's face and generates video data, which is data of the captured video images. The line-of-sight detection camera 151 supplies the generated video data to the captured data acquisition unit 120.

The light emitting device 152 is a device that emits light for line-of-sight detection, and it is a LED (light-emitting diode), for example. The light emitting device 152 emits infrared light with a wavelength of 850 nanometers, for example, towards the imaging range of the line-of-sight detection camera 151. The light emitting device 152 emits infrared light and the line-of-sight detection camera 151 captures images of eyeballs of the user on which the infrared light is reflected, and thereby detects the user's line-of-sight.

The recording device 160 is a recording device that stores captured data supplied from the camera 150. The recording device 160 is a memory card including a flash memory or a nonvolatile recording device such as an SSD (Solid State Drive) or an HDD (Hard Disc Drive), for example. The recording device 160 connects to the recording control unit 123, receives specified data from the recording control unit 123, and records the received data. Further, the recording device 160 supplies an event file containing the recorded event recording data to the reproduction control unit 124 in response to an instruction from the reproduction control unit 124. The recording device 160 may be configured to be detachable or undetachable from the recording/reproducing device 10.

Figure 2:
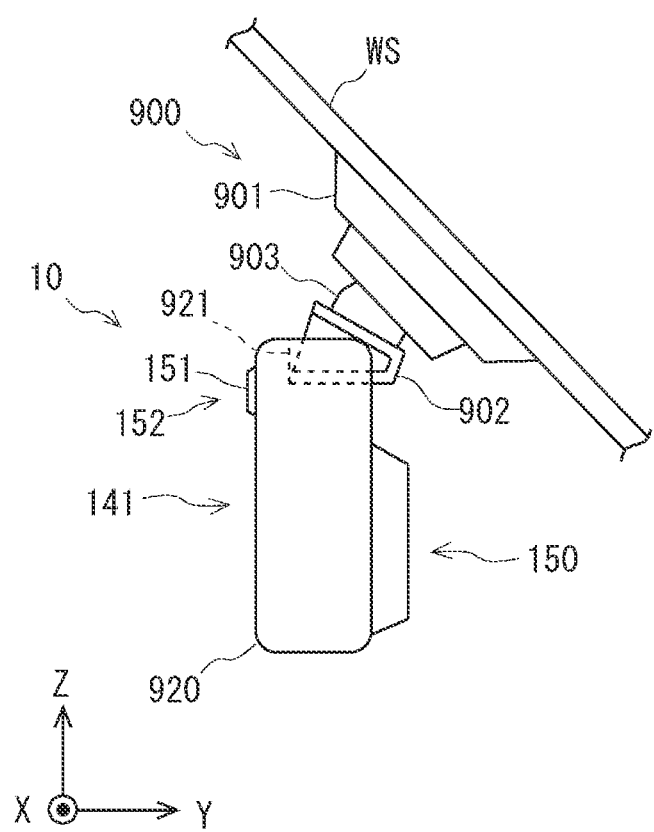
FIG. 2 is a right side view of the recording/reproducing device according to the first embodiment.
Figure 3:
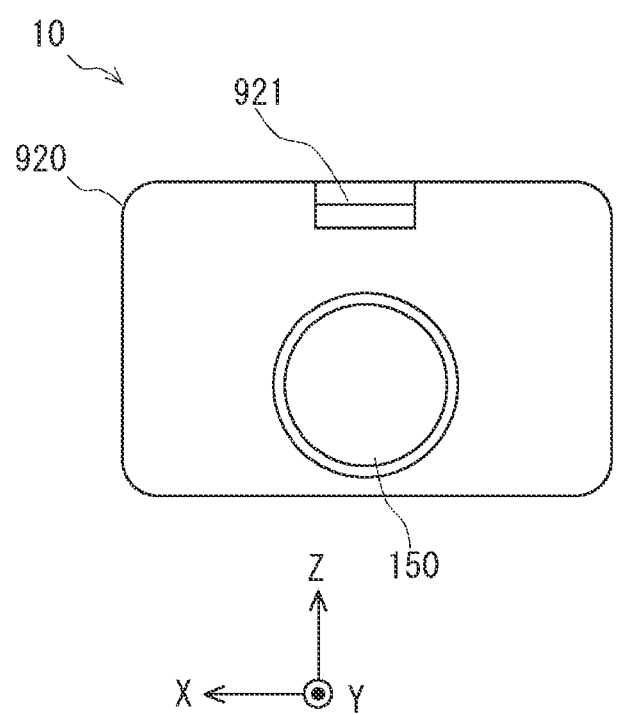
FIG. 3 is a back view of the recording/reproducing device according to the first embodiment.
Figure 4:
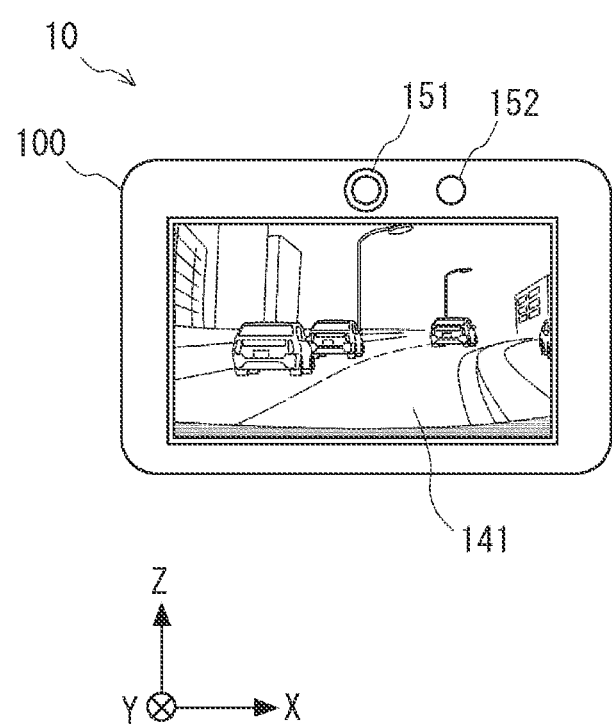
FIG. 4 is a front side view of the recording/reproducing device according to the first embodiment.

A mechanical configuration of the recording/reproducing device 10 is described hereinafter with reference to FIGS. 2 to 4. FIG. 2 is a right side view of the recording/reproducing device 10 according to the first embodiment. FIG. 3 is a back view of the recording/reproducing device 10 according to the first embodiment, which is viewed from the imaging direction. FIG. 4 is a front side view of the recording/reproducing device 10 according to the first embodiment, which is viewed from the display direction. Note that, for the convenience of illustrating the positional relationship of the components, a right-handed orthogonal coordinate system is shown in FIGS. 2 to 4. Further, when an orthogonal coordinate system is shown in the following figures, the x-axis, y-axis, and z-axis directions of FIGS. 2 to 4 and the x-axis, y-axis, and z-axis directions of the orthogonal coordinate system respectively coincide with each other.

As shown in FIG. 2, the recording/reproducing device 10 is fixed to a wind shield (WS) of a vehicle through a bracket 900. The bracket 900 includes a bonding part 901, a holding part 902, and a ball joint 903.

The bonding part 901 is a member where an adhesive is applied onto the surface in contact with the wind shield WS. The bonding part 901 is bonded to an arbitrary position of the wind shield WS, which allows the bracket 900 to be fixed.

The holding part 902 is attachable/detachable from an attach/detach part 921 of the recording/reproducing device 10 and fits this part to prevent that the mounted recording/reproducing device 10 comes off while the vehicle is moving or displacement of the shooting direction occurs. For example, the holding part 902 has a rib or a groove that is slidably engaged with the attach/detach part 921 of the recording/reproducing device 10 in a specified direction, and when it is slid by a specified dimension, it is locked by a lock mechanism (not shown) and fixed tight.

The ball joint 903 is a joint mechanism that is placed to adjust the angle between the bonding part 901 and the holding part 902, and it moves when a specified external force acts. In the state where the bonding part 901 is bonded to the wind shield WS and the holding part 902 fits the recording/reproducing device 10, the ball joint 903 does not move unless a specific external force is applied.

A user who uses the recording/reproducing device 10 bonds the bonding part 901 to the wind shield WS and also causes the holding part 902 to fit the attach/detach part 921 of the recording/reproducing device 10. The recording/reproducing device 10 is thereby fixed to the vehicle.

It should be noted that, when removing the recording/reproducing device 10 fixed to the vehicle, a user releases the attach/detach part 921 of the recording/reproducing device 10 from the holding part 902. When releasing the attach/detach part 921 from the holding part 902, a user unlocks the lock mechanism (not shown) and slides the attach/detach part 921 to separate off the holding part 902. The recording/reproducing device 10 is thereby detached from the vehicle, and a user can hold the recording/reproducing device 10.

As shown in FIGS. 2 to 4, the recording/reproducing device 10 has a substantially rectangular parallelepiped shape in which the front side and the backside are the principal surfaces of a rectangle and the thickness is about a fraction of the length of the short sides of the rectangle projected from the front side. The recording/reproducing device 10 is covered with a case 920 made of resin.

The recording/reproducing device 10 has an objective lens of the camera 150 which is uncovered and visible from the outside on its back face, and also has the attach/detach part 921 on its top face. Thus, the attach/detach part 921 on the top surface of the recording/reproducing device 10 fits the holding part of the bracket 900, and thereby the recording/reproducing device 10 is fixed to the vehicle with the objective lens of the camera 150 visible from the outside in the travelling direction of the vehicle. The front face of the recording/reproducing device 10 faces the user side in the state where it is fixed to the vehicle in this manner. On the front face of the recording/reproducing device 10 are placed a display panel of the display unit 141, the line-of-sight detection camera 151, and the light emitting device 152. The recording/reproducing device 10 is installed in this way, and thereby the recording/reproducing device 10 captures video images the travelling direction and displays the captured video to the user. The display unit 141 shown in FIG. 4 is in the state of displaying the event recording data.

Further, the recording/reproducing device 10 has the line-of-sight detection camera 151 and the light emitting device 152 on the display surface side of the display unit 141. In this structure, the emitting device 152 emits infrared light to the user's face facing the display unit 141, and the line-of-sight detection camera 151 captures images of the user's face irradiated with infrared light. The size of the display panel of the recording/reproducing device 10 is 1.5 to 4 inches in the diagonal line, for example. Further, the size of the case 920 is about 5 to 10 centimeters in the width direction (x-axis direction), for example.

Figure 5:
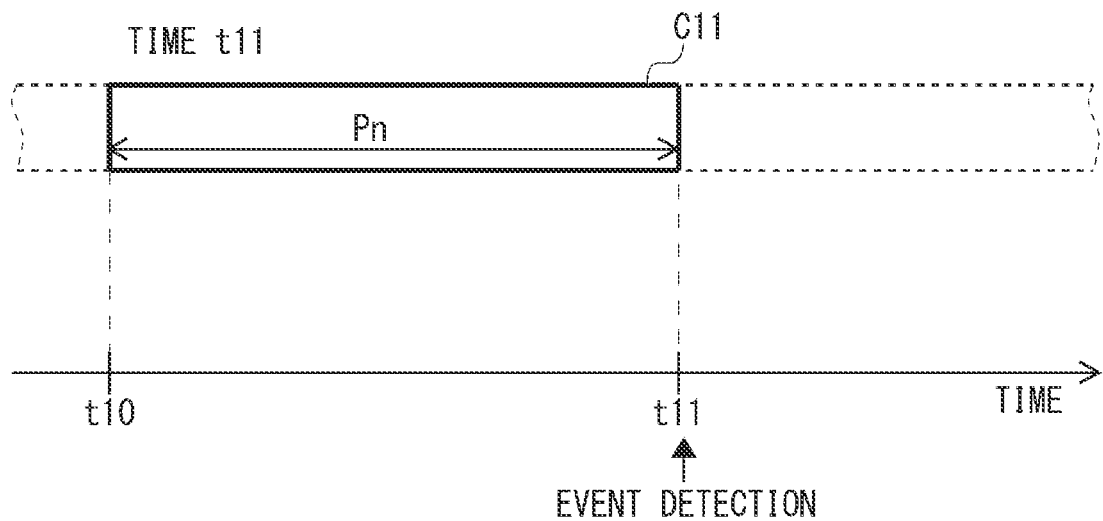
FIG. 5 is a first view showing the relationship between captured data stored in the recording/reproducing device and time.

Captured data is described hereinafter with reference to FIG. 5. FIG. 5 is a first view showing the relationship between captured data stored in the recording/reproducing device and time. The horizontal axis of the figure indicates time, and it shows that the time elapses in the direction of the arrow (rightward) from time t10 to time t11.

The elongated shape shown along the time axis is captured data C11 at time t11. The captured data C11 is captured data generated by the camera 150 and stored in the buffer memory 121. The recording/reproducing device 10 is configured to constantly store the captured data for a predetermined period Pn. The period Pn is a period of 60, 120, or 150 seconds, for example. The captured data C11 at time t11 is captured data from time t10, which precedes time t11 by the period Pn, to time t11. Further, in the buffer memory 121, the past captured data that is older than the period Pn is sequentially erased with the lapse of time.

The example shown in FIG. 5 assumes that the recording/reproducing device 10 detects the occurrence of an event at time t11. Thus, the recording/reproducing device 10 performs processing of generating event recording data, using time t11 as a reference.

Figure 6:
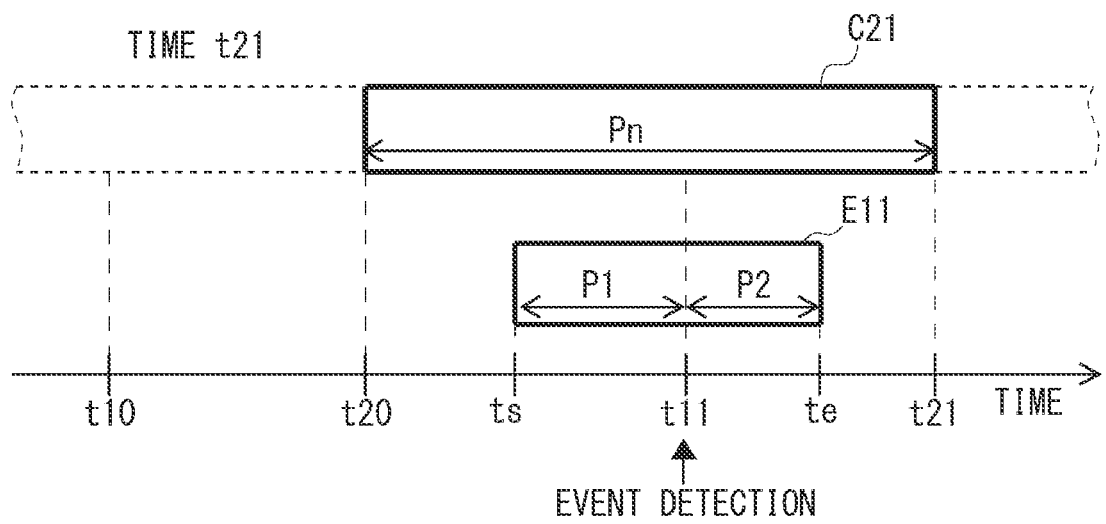
FIG. 6 is a second view showing the relationship between captured data stored in the recording/reproducing device and time.

Captured data and event recording data after the occurrence of an event is detected is described hereinafter with reference to FIG. 6. FIG. 6 is a second view showing the relationship between captured data stored in the recording/reproducing device and time. FIG. 6 shows the structure of data at time t21, which is later than time t11. Data stored in the buffer memory 121 at time t21 is captured data C21 from time t20, which precedes time t21 by the period Pn, to time t21.

The rectangle shown under the captured data C21 is event recording data E11. The event recording data E11 is extracted from the captured data according to an event detected at time t11. In this embodiment, using time t11 when an event is detected as a reference, the recording/reproducing device 10 sets time ts, which precedes time t11 by the period P1, as the start time of the event recording data. Further, in this embodiment, the recording/reproducing device 10 sets time te, at which a period P2 has elapsed from the time t11 when an event is detected as a reference, as the end time of the event recording data. The period P1 and the period P2 are periods of 10, 15, or 20 seconds, for example. Specifically, the recording/reproducing device 10 stores the captured data for the period from time ts to time te as the event recording data E11.

By generating the event recording data as described above, the recording/reproducing device 10 is able to record the captured data for the period before and after the event occurred. This allows a user to visually check the situation around the vehicle before and after the occurrence of the event by reproducing the event recording data stored by the recording/reproducing device 10 after the occurrence of the event.

Note that the recording/reproducing device 10 may record a normal file, in addition to the event recording data, into the recording device 160. In this case, the recording/reproducing device 10 extracts captured data for a specified period from the captured data stored in the buffer memory 121, and records the extracted captured data as a normal file into the recording device 160. The recording/reproducing device 10 may perform processing of recording a normal file and processing of storing event recording data in parallel.

Figure 7:
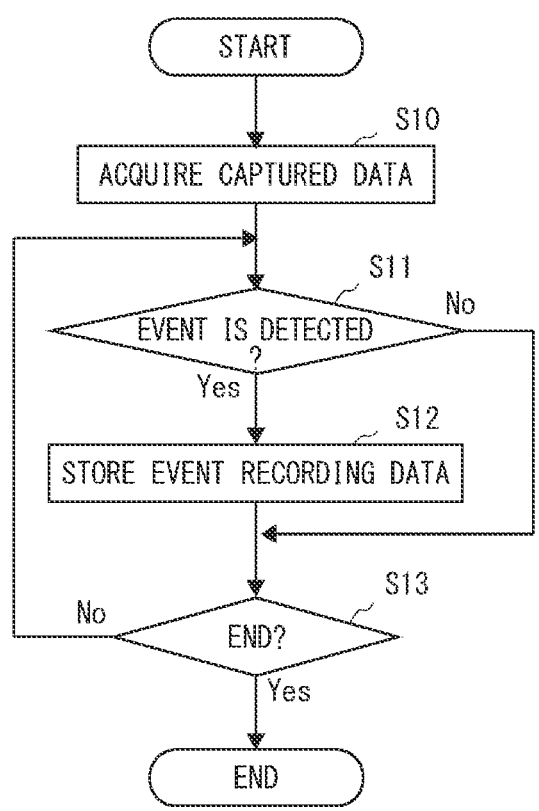
FIG. 7 is a flowchart in the case where the recording/reproducing device detects the occurrence of an event.

A process that is performed by the recording/reproducing device 10 is described hereinafter with reference to FIG. 7. FIG. 7 is a flowchart in the case where the recording/reproducing device detects the occurrence of an event. FIG. 7 shows the process that is performed by the control unit 100 in the case where the recording/reproducing device 10 detects an event. The flowchart of FIG. 7 is started under arbitrary conditions, such as when power is supplied from a vehicle to the recording/reproducing device 10 at the operation start of the vehicle or the like.

First, the control unit 100 starts acquiring captured data (Step S10). In Step S10, the control unit 100 also starts detecting an event. The captured data is supplied from the camera 150 at regular time intervals (e.g., 30 flames per second). The captured data acquisition unit 120 supplies the captured data supplied from the camera 150 to the buffer memory 121. The buffer memory 121 stores the captured data of a predetermined period (e.g. 60 seconds), and after the captured data of a predetermined period is stored, sequentially deletes old captured data and stores new captured data.

Next, the event detection unit 127 determines whether the occurrence of an event is detected from information supplied from the acceleration sensor 142 (Step S11). When it is determined that the occurrence of an event is detected (Step S11: Yes), the recording control unit 123 generates event recording data and records it into the recording device 160 (Step S12). On the other hand, when it is not determined that the occurrence of an event is detected in Step S11 (Step S11: Yes), the control unit 100 proceeds to Step S13 without generating the event recording data.

Then, the control unit 100 determines whether to end the process (Step S13). When it is not determined to end the process (Step S13: No), the control unit 100 returns to Step S11 and determines whether the occurrence of an event is detected again. On the other hand, when it is determined to end the process (Step S13: Yes), the control unit 100 ends the process.

Figure 8:
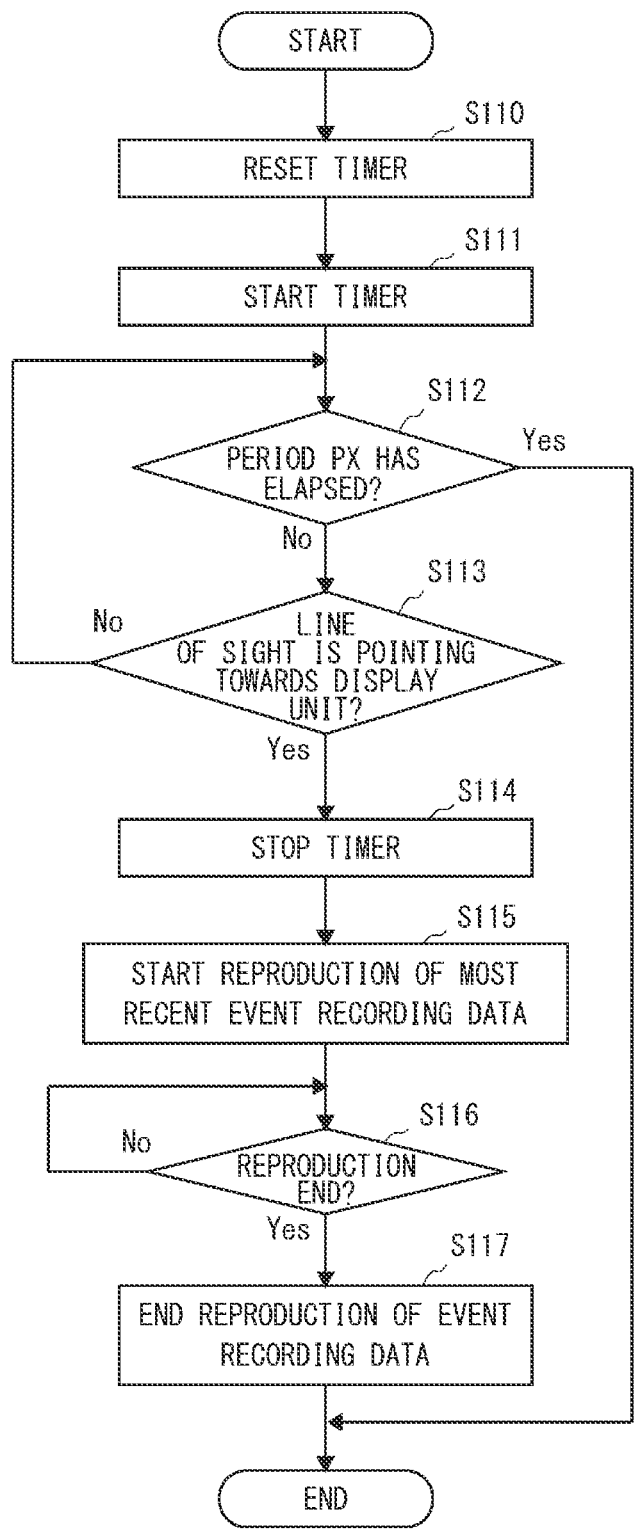
FIG. 8 is a flowchart in the case where the recording/reproducing device according to the first embodiment reproduces event recording data.

An event recording data reproduction process that is performed by the control unit 100 is described hereinafter with reference to FIG. 8. FIG. 8 is a flowchart in the case where the recording/reproducing device reproduces event recording data. The process of FIG. 8 is started when Step S11 in the process of FIG. 7 results in Yes, that is, when an event is detected.

First, upon detection of an event, the reproduction control unit 124 resets a count value of the timer 129 (Step S110), and then starts the timer 129 (Step S111). Note that the timer 129 increments the count value sequentially with the lapse of time. Next, the reproduction control unit 124 reads the count value of the timer 129 and determines whether the count value has reached the period PX (Step S112). When it is determined that the count value has reached the period PX (Step S112: Yes), the control unit 100 ends the process shown in FIG. 8.

When, on the other hand, it is not determined that the count value has reached the period PX in Step S112 (Step S112: No), the reproduction control unit 124 determines whether a user's line of sight is pointing towards the display unit 141 from a signal related to line-of-sight detection received from the line-of-sight detection unit 130 (Step S113).

When it is not determined that the user's line of sight is pointing towards the display unit 141 (Step S113: No), the control unit 100 determines whether the count value has reached the period PX again in Step S112. On the other hand, when it is determined that the user's line of sight is pointing towards the display unit 141 in Step S113 (Step S113: Yes), the reproduction control unit 124 stops counting the timer 129 (Step S114), and starts reproducing the event recording data to be reproduced (Step S115). The event recording data to be reproduced is the event recording data stored in the process of FIG. 7 on the basis of the event that has triggered the start of the process in FIG. 8, which is the event recording data stored most recently when the line of sight has pointed towards the display unit.

Next, the reproduction control unit 124 determines whether to end the reproduction of the event recording data (Step S116). To be specific, the reproduction control unit 124 detects whether the operation control unit 125 that receives a user's operation has received an operation to stop the reproduction of event recording data. When the reproduction ending operation is not received (Step S116, No), the control unit 100 continues the reproduction of event recording data. On the other hand, when the reproduction ending operation is received (Step S116, Yes), the reproduction control unit 124 performs processing of ending the reproduction of event recording data (Step S117), and thereby ends the process shown in FIG. 8.

The event recording data reproduction process performed by the control unit 100 is described above. In the above process, Step S114 and Step S115 may be interchanged or may be performed simultaneously.

When starting reproducing event recording data in Step S115, display that prompts a user to perform an operation of permitting the start of reproduction may be shown, and reproduction of event recording data may be started when a user's permission is given. This allows the recording/reproducing device 10 to reproduce event recording data according to a user's intention without need of a complicated operation.

The first embodiment is described above. In the above configuration, when a user's line of sight is pointing towards the display unit 141 before the predetermined period PX has elapsed after the occurrence of a specified event, the recording/reproducing device 10 reproduces the most recent event recording data. This allows a user to check the event recording data by looking at the display unit of the recording/reproducing device immediately after the occurrence of an event such as an accident, for example. Therefore, according to the first embodiment, there are provided a recording/reproducing device and the like that reproduce stored data without a complicated operation.

Modified Example of First Embodiment

A modified example of the first embodiment is described hereinafter. In a recording/reproducing device according to the modified example of the first embodiment, a recording device that at least includes the camera 150 and the captured data acquisition unit 120 that generate captured data and a reproducing device that at least includes the line-of-sight detection camera 151 and the display unit 141 are separated.

Figure 9:
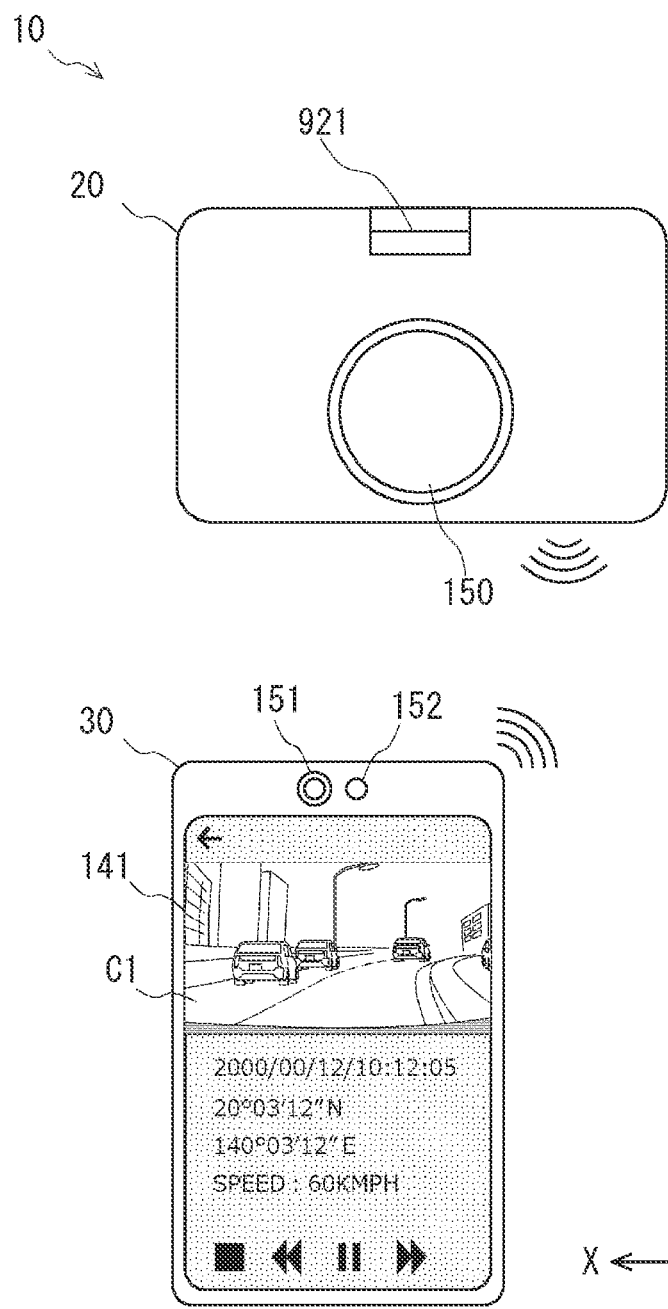
FIG. 9 is an overview of a recording/reproducing device according to a modified example of the first embodiment.

FIG. 9 is an overview of a recording/reproducing device according to a modified example of the first embodiment. As shown in the figure, the recording/reproducing device 10 includes a recording unit 20 and a reproducing unit 30. The recording unit 20 shown in the upper part of the figure includes a camera 150 and an attach/detach part 921, and it is fixed to a bracket 900 and captures the scene in the traveling direction of the vehicle. The reproducing unit 30 shown in the lower part of the figure is separated from the recording unit 20, and it includes a line-of-sight detection camera 151, a light emitting device 152, and a display unit 141. The reproducing unit 30 is a mobile terminal that includes a built-in battery and is portable by a user. The recording unit 20 and the reproducing unit 30 are connected by wireless communication. The reproducing unit 30 shown in the figure is in the state of displaying event recording data C1 on the display unit 141. Note that, as shown therein, in addition to the video of the event recording data, the date and time of the occurrence of an event, the latitude and longitude, the traveling speed and the like may be displayed on the display unit 141.

Figure 10:
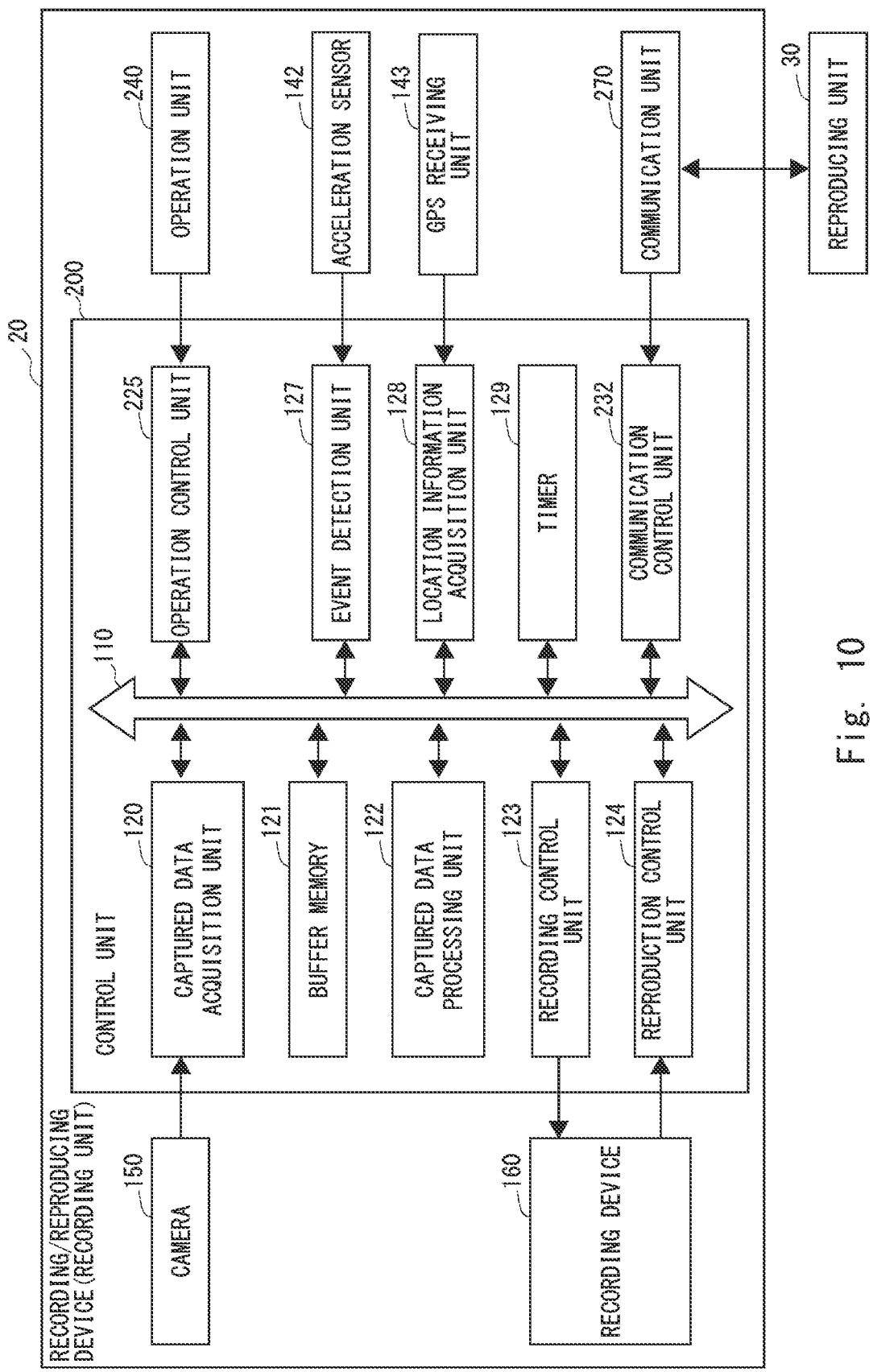
FIG. 10 is a block diagram showing the configuration of a recording unit according to the modified example of the first embodiment.

The configuration of the recording unit 20 is described hereinafter with reference to FIG. 10. FIG. 10 is a block diagram showing the configuration of the recording unit according to the modified example of the first embodiment.

The recording unit 20 includes, as main elements, a control unit 200, and a camera 150, a recording device 160, an operation unit 240, an acceleration sensor 142, a GPS receiving unit 143, and a communication unit 270, which are connected to the control unit 200. Further, the control unit 200 includes a captured data acquisition unit 120, a buffer memory 121, a captured data processing unit 122, a recording control unit 123, a reproduction control unit 124, an operation control unit 225, an event detection unit 127, a location information acquisition unit 128, a timer 129, and a communication control unit 232, which are connected to the bus line 110. In the above-described elements, the elements having the same function as the elements included in the recording/reproducing device 10 according to the first embodiment are denoted by the same reference symbols. The description of the elements denoted by the same reference symbols is omitted as appropriate, and the elements denoted by new reference symbols are described hereinbelow.

The operation unit 240 is a user interface for receiving a user's operation on the recording unit 20. The user interface may be an operation button or a touch sensor, for example. Further, the user interface may be a receiving unit of infrared rays or radio communication, and it may receive a signal transmitted from a remote control or the like. The operation unit 240 may be an interface that receives an instruction for a specified operation from the reproducing unit 30 through the communication unit 270. The operation unit 240 supplies operation information, which is information about a received operation, to the operation control unit 225 through a specified interface. The operation information is an instruction for starting event recording, for example.

The communication unit 270 is an interface that is connected for communication with the reproducing unit 30, and it is composed of an antenna and a circuit that modulates or demodulates a signal transmitted through the antenna and the like, for example. The communication unit 270 receives a signal from the reproducing unit 30 and transmits event recording data to the reproducing unit 30.

The operation control unit 225 acquires operation information received by the operation unit 240, and outputs an operation instruction based on the operation information to each component. The communication control unit 232 controls communication with the reproducing unit 30 performed through the communication unit 270. For example, when the communication control unit 232 receives a signal that requests reproduction of event recording data from the reproducing unit 30, it supplies this request signal to the reproduction control unit 124. Further, when the reproduction control unit 124 outputs event recording data in response to a request from the reproducing unit 30, the communication control unit 232 transmits this event recording data to the reproducing unit 30 through the communication unit 270.

Figure 11:
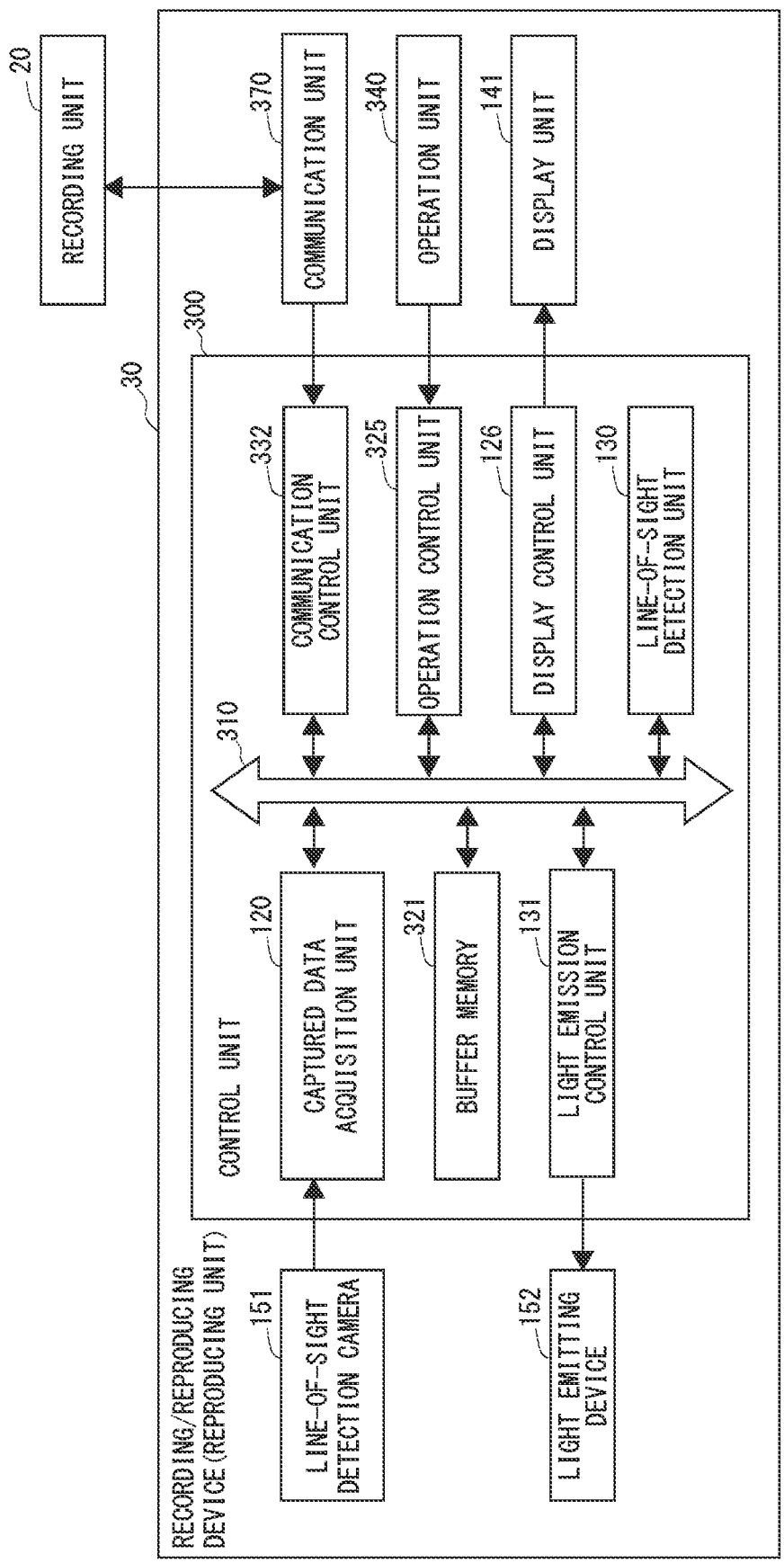
FIG. 11 is a block diagram showing the configuration of a reproducing device according to the modified example of the first embodiment.

The reproducing unit 30 is described hereinafter with reference to FIG. 11. FIG. 11 is a block diagram showing the configuration of the reproducing device according to the modified example of the first embodiment. The reproducing unit 30 includes, as main elements, a control unit 300, and a display unit 141, a line-of-sight detection camera 151, a light emitting device 152, an operation unit 340, and a communication unit 370, which are connected to the control unit 300. Further, the control unit 300 includes a captured data acquisition unit 120, a light emission control unit 131, a display control unit 126, a line-of-sight detection unit 130, a buffer memory 321, a communication control unit 332, and an communication control unit 332, which are connected to a bus line 310.

The communication unit 370 is an interface that is connected for communication with the recording unit 20, and it has the same configuration as the communication unit 270 included in the recording unit 20, for example. The communication unit 370 transmits a signal that requests event recording data to the recording unit 20, and also receives event recording data from the recording unit 20 and supplies the received event recording data to the communication control unit 332.

The operation control unit 325 acquires operation information received by the operation unit 340, and outputs an operation instruction based on the operation information to each component. The communication control unit 332 controls communication with the recording unit 20 performed through the communication unit 370. For example, the communication control unit 332 transmits a signal that requests reproduction of event recording data to the reproducing unit 30 through the communication unit 370. Further, the communication control unit 332 supplies event recording data received through the communication unit 370 to the buffer memory 321.

The operation unit 340 is a user interface for receiving a user's operation on the reproducing unit 30. The user interface may be an operation button or a touch sensor placed on the display unit 141, for example. The operation unit 340 supplies operation information, which is information about a received operation, to the operation control unit 325 through a specified interface. The operation information is an instruction for starting the reproduction of event recording data or an instruction for ending the reproduction of event recording data being reproduced, for example.

The buffer memory 321 is a volatile memory. The buffer memory 321 temporarily stores event recording data transmitted from the recording unit 20, and supplies the stored event recording data to the display control unit 126.

Note that the above-described reproducing unit 30 may be implemented by a smartphone or tablet having a wireless communication function. In the case of using a smartphone as the reproducing unit 30, the function of the reproducing unit 30 may be exerted by installing an application program for reproducing event recording data into this smartphone and executing the installed application program, for example.

A modified example of the first embodiment is described above. When a specified event occurs, the recording/reproducing device 10 according to the modified example of the first embodiment records event recording data into the recording device 160 in the recording unit 20. When the line-of-sight detection unit 130 in the reproducing unit 30 detects that a user's line of sight is pointing towards a display unit 41 before the period PX is reached after the occurrence of the event, it displays event recording data on the display unit 141. This structure allows a user who uses the recording/reproducing device 10 according to the modified example of the first embodiment to visually check the event recording data of the event that has occurred most recently by looking at the reproducing unit 30 at hand. Therefore, according to the modified example of the first embodiment, there are provided a recording/reproducing device and the like that reproduce stored data without a complicated operation in an optimum manner at a position easily viewable to a user.

Second Embodiment

A second embodiment is described hereinafter. In a recording/reproducing device according to the second embodiment, the function of the line-of-sight detection unit 130 is different from that of the first embodiment in the process of reproducing event recording data. In the recording/reproducing device 10 according to the second embodiment, the line-of-sight detection unit 130 detects the position of user's both eyes from captured data acquired from the line-of-sight detection camera 151, and measures the distance between the detected both eyes.

Figure 12:
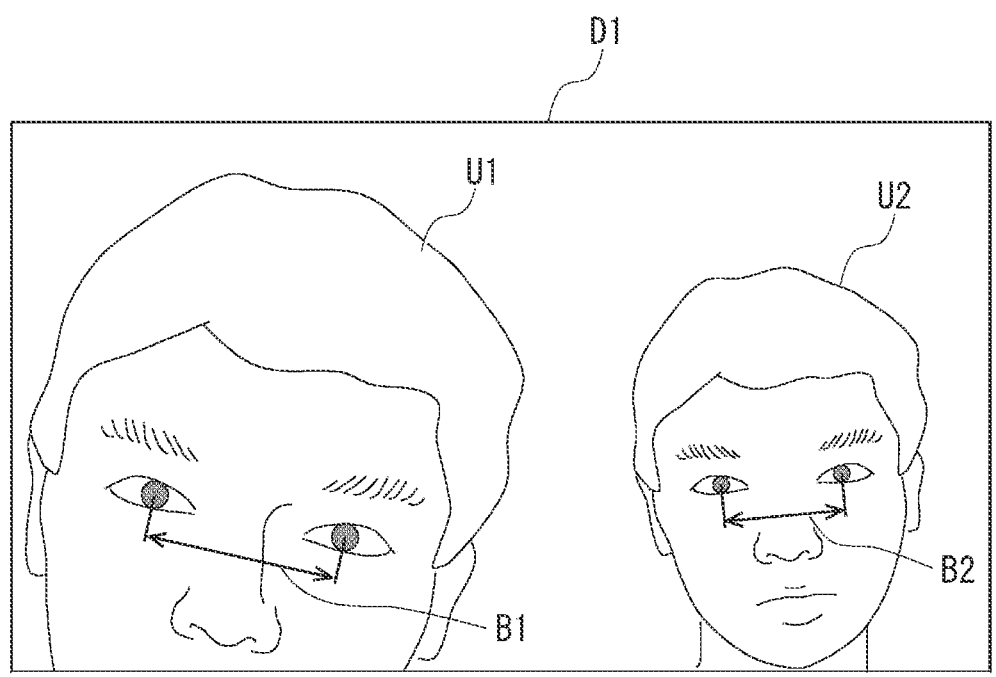
FIG. 12 is a view showing an example of captured data acquired by a line-of-sight detection camera according to a second embodiment.

FIG. 12 is a view showing an example of captured data acquired by the line-of-sight detection camera 151 according to the second embodiment. A video image D1 shown in the figure is an image of video data acquired by the line-of-sight detection camera 151. In the video image D1, a user U1 is shown on the left and a user U2 is shown on the right, when viewed from the front. The face of the user U1 is closer to the line-of-sight detection camera 151 than the face of the user U2 is. The line-of-sight detection unit 130 recognizes the face and eyes of a person from pixel values contained in the captured data, and calculates the distance between two eyes contained in the recognized face on the captured data. For example, a distance B1 between both eyes of the user U1 is greater than a distance B2 between both eyes of the user U2. In this manner, a user's face captured by the line-of-sight detection camera 151 tends to be farther as the distance between both eyes is shorter, and a user's face tends to be closer as the distance between both eyes is longer. The line-of-sight detection unit 130 determines whether a value corresponding to the distance between both eyes of a user is greater than a predetermined threshold Bth or not. The recording/reproducing device 10 is configured to start the reproduction of event recording data when the distance between both eyes is greater than the threshold Bth. Specifically, the reproduction control unit 124 calculates the distance between both eyes of a user, and when the calculated value is greater than a predetermined threshold, starts reproducing event recording data. The threshold Bth is set to a value when a user's face is as close as about 50 cm to the display surface of the display unit 141 on the basis of the average width of both eyes, for example.

Figure 13:
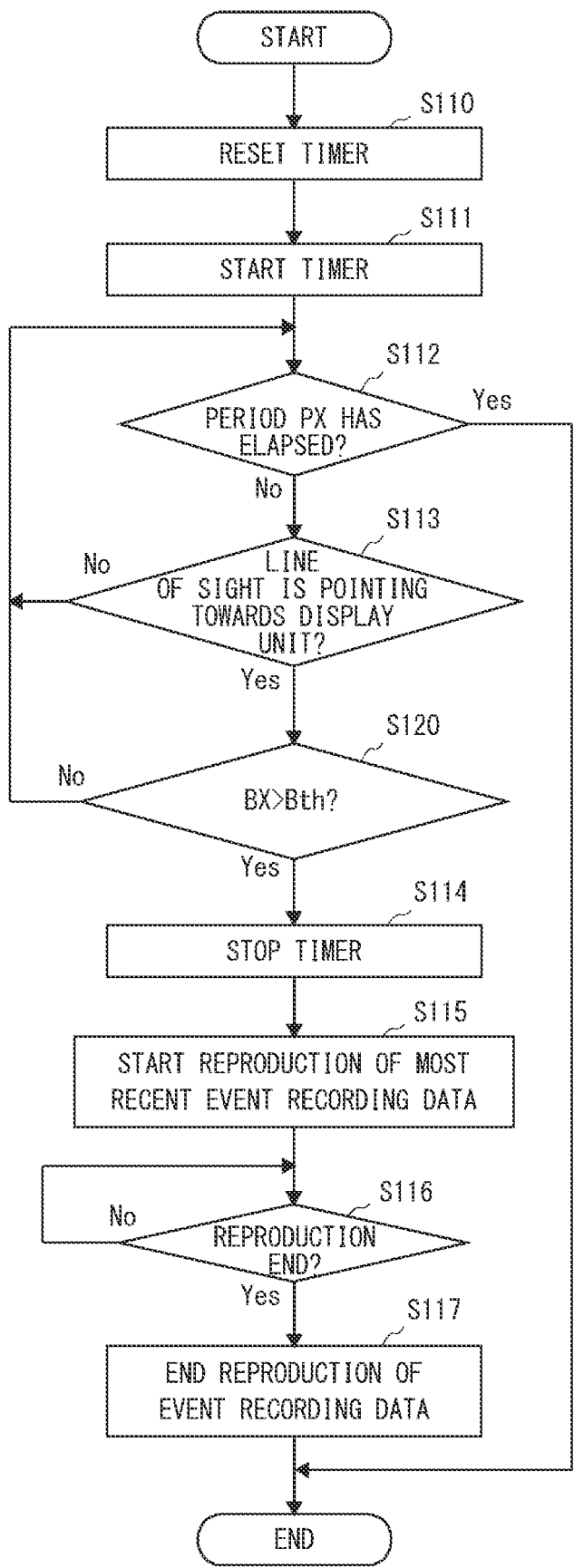
FIG. 13 is a flowchart in the case where the recording/reproducing device according to the second embodiment reproduces event recording data.

A process of the recording/reproducing device according to the second embodiment is described hereinafter with reference to FIG. 13. FIG. 13 is a flowchart in the case where the recording/reproducing device according to the second embodiment reproduces event recording data. The flowchart according to the second embodiment is different from the process according to the first embodiment in that Step S120 is inserted between Steps S113 and S114. The same points as in the flowchart of the first embodiment are not redundantly described below, and different points from the first embodiment are described.

In Step S113, when it is determined that a user's line of sight is pointing towards the display unit 141 in Step S113 (Step S113: Yes), the reproduction control unit 124 determines whether a distance BX between both eyes of the user is greater than the threshold Bth (Step S120). When it is not determined that the distance BX is greater than the threshold Bth (Step S120: No), the control unit 100 proceeds to Step S112. On the other hand, when it is determined that the distance BX is greater than the threshold Bth (Step S120: Yes), the reproduction control unit 124 proceeds to Step S114.

The second embodiment is described above. In the above configuration, when a user's line of sight is pointing towards the display unit 141 before the predetermined period PX has elapsed after the occurrence of a specified event and when the user's face is not away from the display unit 141, the recording/reproducing device 10 according to the second embodiment reproduces the most recent event recording data. This allows a user to check the event recording data by coming closer to the display unit of the recording/reproducing device and looking at the display unit immediately after the occurrence of an event such as an accident, for example. Therefore, according to the second embodiment, there are provided a recording/reproducing device and the like that reproduce stored data without a complicated operation.

The above-described program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

The present embodiment is not restricted to the above-described embodiments, and various changes and modifications may be made without departing from the scope of the invention. For example, although the above-described recording/reproducing device is described as an example of a dashboard camera that is mounted on an automobile, the recording/reproducing device may be mounted on different types of vehicles such as a motorcycle and a bicycle. Further, the recording/reproducing device is not necessarily mounted on a vehicle, and it may be mounted on movable objects such as a railroad car, a ship and an aircraft. Further, the recording/reproducing device may be worn by human, a walking robot, or the like.

The present application is applicable to a recording/reproducing device that is mounted on a vehicle and records and reproduces a video.

What is claimed is:

1. A recording/reproducing device used in a movable object and recording and reproducing captured data captured by a camera, comprising:
 a processor coupled to a memory storing instructions to permit the processor to function as:
  a captured data acquisition unit configured to acquire the captured data;
  an event detection unit configured to detect occurrence of an event on the movable object;
  a recording control unit configured to store, as event recording data, the captured data for a predetermined period from at least part of the captured data on a basis of detection of the event;
  a line-of-sight detection unit configured to detect that a line of sight is pointing towards a display unit configured to display the event recording data; and
  a reproduction control unit configured to start reproduction of the event recording data stored most recently when the line-of-sight detection unit detects that a line of sight is pointing towards the display unit within a predetermined period immediately after detection of the event; and a line-of-sight detection camera mounted on a display surface side of the display unit, wherein the captured data acquisition unit acquires line-of-sight captured data captured by the line-of-sight detection camera, and wherein the line-of-sight detection unit detects that a user's line of sight is pointing towards the display unit on a basis of the line-of-sight captured data.

2. The recording/reproducing device according to claim 1, wherein the line-of-sight detection unit further detects positions of eyes of a user, and wherein the reproduction control unit determines to start reproduction of the event recording data on a basis of a distance between the eyes of the user.

3. The recording/reproducing device according to claim 2, wherein the reproduction control unit starts reproduction of the event recording data when a distance between the eyes of the user is greater than a predetermined threshold.

4. A recording/reproducing method comprising:

a captured data acquisition step of acquiring captured data captured by a camera used in a movable object;

an event detection step of detecting occurrence of an event on the movable object;

a recording control step of storing, as event recording data, the captured data for a predetermined period from at least part of the captured data on a basis of detection of the event;

a line-of-sight detection step of detecting that a line of sight is pointing towards a display unit for displaying the event recording data; and a reproduction control step of starting reproduction of the event recording data stored most recently when the line-of-sight detection step detects that a line of sight is pointing towards the display unit within a predetermined period immediately after detection of the event, wherein the captured data acquisition step includes acquiring line-of-sight captured data captured by a line-of-sight detection camera mounted on a display surface side of the display unit, and wherein the line-of-sight detection step includes detecting that a user's line of sight is pointing towards the display unit on a basis of the line-of-sight captured data.

5. A non-transitory computer readable medium storing a program to be executed by a computer to put a recording/reproducing device into operation, comprising:

a captured data acquisition step of acquiring captured data captured by a camera used in a movable object;

an event detection step of detecting occurrence of an event on the movable object;

a recording control step of storing, as event recording data, the captured data for a predetermined period from at least part of the captured data on a basis of detection of the event;

a line-of-sight detection step of detecting that a line of sight is pointing towards a display unit for displaying the event recording data; and a reproduction control step of starting reproduction of the event recording data stored most recently when the line-of-sight detection step detects that a line of sight is pointing towards the display unit within a predetermined period immediately after detection of the event, wherein the captured data acquisition step includes acquiring line-of-sight captured data captured by a line-of-sight detection camera mounted on a display surface side of the display unit, and wherein the line-of-sight detection step includes detecting that a user's line of sight is pointing towards the display unit on a basis of the line-of-sight captured data.

\* \* \* \* \*